United States Patent
Merwald et al.

(10) Patent No.: US 9,937,898 B2
(45) Date of Patent: Apr. 10, 2018

(54) METHOD FOR CONTROLLING A WIPING-WASHING PROCESS OF A REAR WINDOW CLEANING SYSTEM FOR A MOTOR VEHICLE

(71) Applicant: Bayerische Motoren Werke Aktiengesellschaft, Munich (DE)

(72) Inventors: Michael Merwald, Munich (DE); Dennis Nolting, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 156 days.

(21) Appl. No.: 14/872,274

(22) Filed: Oct. 1, 2015

(65) Prior Publication Data

US 2016/0016536 A1 Jan. 21, 2016

Related U.S. Application Data

(63) Continuation of application No. PCT/EP2014/056427, filed on Mar. 31, 2014.

(30) Foreign Application Priority Data

Apr. 2, 2013 (DE) ........................ 10 2013 205 793

(51) Int. Cl.
  *B60S 1/58* (2006.01)
  *B60S 1/08* (2006.01)
  *B60S 1/60* (2006.01)

(52) U.S. Cl.
  CPC .......... *B60S 1/0818* (2013.01); *B60S 1/0866* (2013.01); *B60S 1/583* (2013.01); *B60S 1/606* (2013.01)

(58) Field of Classification Search
  None
  See application file for complete search history.

(56) References Cited

U.S. PATENT DOCUMENTS 5,932,983 A 8/1999 Maue et al.
6,121,738 A 9/2000 Meier et al.

FOREIGN PATENT DOCUMENTS

| CN | 1753802 A | 3/2006 |
|---|---|---|
| DE | 24 11 128 A1 | 9/1975 |
| DE | 24 37 030 A1 | 2/1976 |
| DE | 33 32 921 A1 | 3/1985 |
| DE | 42 21 972 A1 | 1/1994 |
| DE | 43 32 105 A1 | 3/1995 |
| DE | 196 39 137 A1 | 3/1998 |

(Continued)

OTHER PUBLICATIONS

International Search Report (PCT/ISA/210) issued in PCT Application No. PCT/EP2014/056427 dated May 12, 2014 with English-language translation (six (6) pages).

(Continued)

*Primary Examiner* — Rami Khatib
*Assistant Examiner* — Gerrad A Foster
(74) *Attorney, Agent, or Firm* — Crowell & Moring LLP

(57) ABSTRACT

A method is provided for controlling a wiping-washing process of a rear window cleaning system for a motor vehicle that has at least one windshield cleaning system and a headlight cleaning system for headlights of the motor vehicle. The wiping-washing process of the rear window cleaning system is controlled on the basis of an actuation of the headlight cleaning system and/or the windscreen cleaning system.

17 Claims, 2 Drawing Sheets

(56) References Cited

FOREIGN PATENT DOCUMENTS

DE   199 57 029 A1   5/2001
DE   103 13 464 A1   10/2004

OTHER PUBLICATIONS

German Search Report issued in counterpart German Application No. DE 10 2013 205 739.8 dated Nov. 19, 2013 with partial English-language translation (ten (10) pages).
"Volvo V70 & XC70 Owners Manual," Jan. 1, 2010, Goeteborg, Sweden, XP055116130 (six (6) pages).
Chinese Office Acton issued in counterpart Chinese Application No. 201480014645.9 dated Jun. 24, 2016 with English translation (17 pages).

METHOD FOR CONTROLLING A WIPING-WASHING PROCESS OF A REAR WINDOW CLEANING SYSTEM FOR A MOTOR VEHICLE

CROSS REFERENCE TO RELATED APPLICATIONS

This application is a continuation of PCT International Application No. PCT/EP2014/056427, filed Mar. 31, 2014, which claims priority under 35 U.S.C. § 119 from German Patent Application No. 10 2013 205 793.8, filed Apr. 2, 2013, the entire disclosures of which are herein expressly incorporated by reference.

BACKGROUND AND SUMMARY OF THE INVENTION

The invention relates to a method for controlling a wiping-washing process of a rear window cleaning system of a motor vehicle, which vehicle has at least one front windshield cleaning system and a headlight cleaning system for the headlights of the motor vehicle.

It is basically already known that the rear window wiper can be activated automatically as a function of the actuation of the front windshield wiper. For example, DE 196 39 137 A1 discloses a control device for a front windshield wiper and rear window wiper, wherein the rear window wiper is actuated automatically, inter alia, in such a way that the wiping frequency ratio or the duty cycle between the front windshield wiper and the rear window wiper is predefined.

The wiping-washing process of the rear window cleaning system is, however, basically triggered by manual activation. This entails increased effort for the driver, in particular in winter, since at this time of year an increased occurrence of dirt and road grit are to be expected, leading to heavier soiling of the rear window.

The object of the invention is then to provide a simple and convenient method, as well as a corresponding device, for influencing the control, in particular for automatically triggering a wiping-washing process, of a rear window wiper of a motor vehicle.

This and other objects are achieved by a method according to embodiments of the invention. The method and the advantageous refinements thereof can be carried out by way of an implemented algorithm or a corresponding assembly arrangement in a control device provided for that purpose.

The invention is based on the realization that at present there are already many vehicles on the market which have not only a front windshield wiper and a rear window wiper, but also a front windshield cleaning system and a headlight cleaning system for the headlights of the motor vehicle. The operator control of a headlight cleaning system is often different depending on the vehicle manufacturer and year of construction of the vehicle. The headlight cleaning systems can be activated automatically in this context, as soon as the front windshield washing system is activated when the dipped headlights are switched on, while other systems have a separate switch for manually triggering the headlight cleaning process. In vehicles which are equipped with xenon headlights, a headlight cleaning system is even legally required.

The method according to the invention is defined by the fact that the wiping-washing process of the rear window cleaning system is controlled or influenced as a function of the actuation of the headlight cleaning system and/or of the front windshield cleaning system, in particular in such a way that the wiping-washing process of the rear window cleaning system is triggered as a function of the actuation of the headlight cleaning system and/or of the front windshield cleaning system. In other words, the triggering and also the type of wiping-washing process of the rear window wiper is influenced or controlled as a function of the actuation, in particular as a function of the triggering or triggering time, of the headlight washing process of the headlights or of the front windshield cleaning system.

The triggering of the wiping-washing process of the rear window cleaning system is advantageously influenced by the actuation or the operation of the headlight cleaning system in such a way that the wiping-washing process of the rear window cleaning system is triggered at the latest, but advantageously simultaneously with, the triggering of the headlight cleaning process of the headlight cleaning system. This means that the wiping-washing process is therefore triggered automatically at the latest when the headlights are cleaned.

Alternatively or additionally, the triggering of the wiping-washing process of the rear window wiper can also be influenced by the actuation or the operation of the headlight cleaning system in such a way that the wiping-washing process of the rear window cleaning system is triggered with a predefined first duty cycle with respect to the headlight cleaning process of the headlight cleaning system. It is therefore possible, for example, for the wiping-washing process to be triggered every second time after the headlight cleaning process has been triggered, i.e. the predefined duty cycle between the wiping-washing process of the rear window cleaning system and the headlight cleaning process of the headlight cleaning system would be 1:2.

Alternatively, the first duty cycle could also be predefined in such a way that two wiping-washing processes of the rear window cleaning system occur between two headlight cleaning processes, the predefined first duty cycle between the wiping-washing process of the rear window cleaning system and the headlight cleaning process of the headlight cleaning system would then be 2:1. Such a first duty cycle in which the wiping-washing frequency of the rear window cleaning system is lower than the wiping-washing frequency of the headlight cleaning system presumes that a certain estimation of the time of the next wiping-washing process of the headlight cleaning system is possible.

This can be made possible, for example, if the actuation of the headlight cleaning system and/or of the headlight cleaning process is triggered as a function of the actuation of the front windshield wiper and/or as a function of the actuation of the front windshield cleaning system. It can be defined, for example, that the duty cycle between the front windshield washing process and headlight cleaning process is 10:1. If 1:2 is then predefined as the first duty cycle between the headlight cleaning process and the wiping-washing process of the rear window, this results in a duty cycle between the front windshield washing process and the wiping-washing process of the rear window cleaning system of 1:5.

Analogously to this, the triggering of the wiping-washing process of the rear window wiper can also be influenced by the actuation or the operation of the front windshield cleaning system, in particular in such a way that the wiping-washing process of the rear window cleaning system is triggered with a predefined second duty cycle with respect to the wiping-washing process of the front windshield cleaning system.

The triggering or the type of the wiping-washing process of the rear window cleaning system can also advantageously be influenced by the operation of the rear window heater.

According to an alternative, the rear window heater can be taken into consideration here in such a way that when the rear window heater is active the wiping-washing process of the rear window cleaning system is triggered with a predefined third duty cycle with respect to the headlight cleaning process of the headlight cleaning system or with a predefined fourth duty cycle with respect to the wiping-washing process of the front windshield cleaning system, and/or the quantity of washing water is changed, in particular increased, during the wiping-washing process.

This refinement is therefore advantageous since in the case of an active rear window heater there is a high probability that it is the winter and increased occurrence of dirt and road grit is to be expected during this time. If, when the rear window heater is active, the duty cycle between the headlight cleaning process of the headlight cleaning system and the wiping-washing process of the rear window cleaning system is changed in such a way that the frequency of the wiping-washing process of the rear window cleaning system is increased compared to the frequency of the headlight cleaning process, better cleaning of the rear window can be achieved. Additionally or alternatively, when the rear window heater is active it is also possible to change the quantity of water that is used during the wiping-washing process of the rear window, in particular to increase it, in order thereby to cope with the increased occurrence of dirt.

Likewise, the wiping-washing process of the rear window cleaning system can also be influenced as a function of the operation of the rear window heater such that the (automatic) wiping-washing process of the rear window cleaning system is influenced or triggered as a function of the actuation of the headlight cleaning system, in particular as a function of the triggered headlight cleaning process, only if the rear window heater is operating. The automatic association of the wiping-washing process of the rear window with the headlight cleaning process and the automatic triggering of the wiping-washing process of the rear window on the basis of the headlight cleaning process would therefore take place only in the winter operating mode.

A further parameter for increasing the triggering accuracy of the wiping-washing cycle can occur technically by measuring the current of the rear window heater. By taking into account this realization, the method according to the invention can therefore be developed in such a way that the wiping-washing process of the rear window cleaning system is triggered or influenced as a function of the flow of current through the rear window heater, in particular in such a way that the wiping-washing process of the rear window cleaning system is triggered with a predefined fifth duty cycle with respect to the headlight cleaning process of the headlight cleaning system, and/or the quantity of washing water during the wiping-washing process is changed, as a function of the flow of current through the rear window heater.

Since triggering of the wiping-washing process of the rear window cleaning system can be considered to be more or less appropriate depending on the iced-up state of the rear window, the wiping-washing process of the rear window wiper can also be triggered or influenced as a function of the detected or assumed iced-up state of the rear window, wherein the iced-up state and/or the degree of the iced-up state of the rear window can advantageously be determined by evaluating the calculated or measured starting current of the rear window wiper motor.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
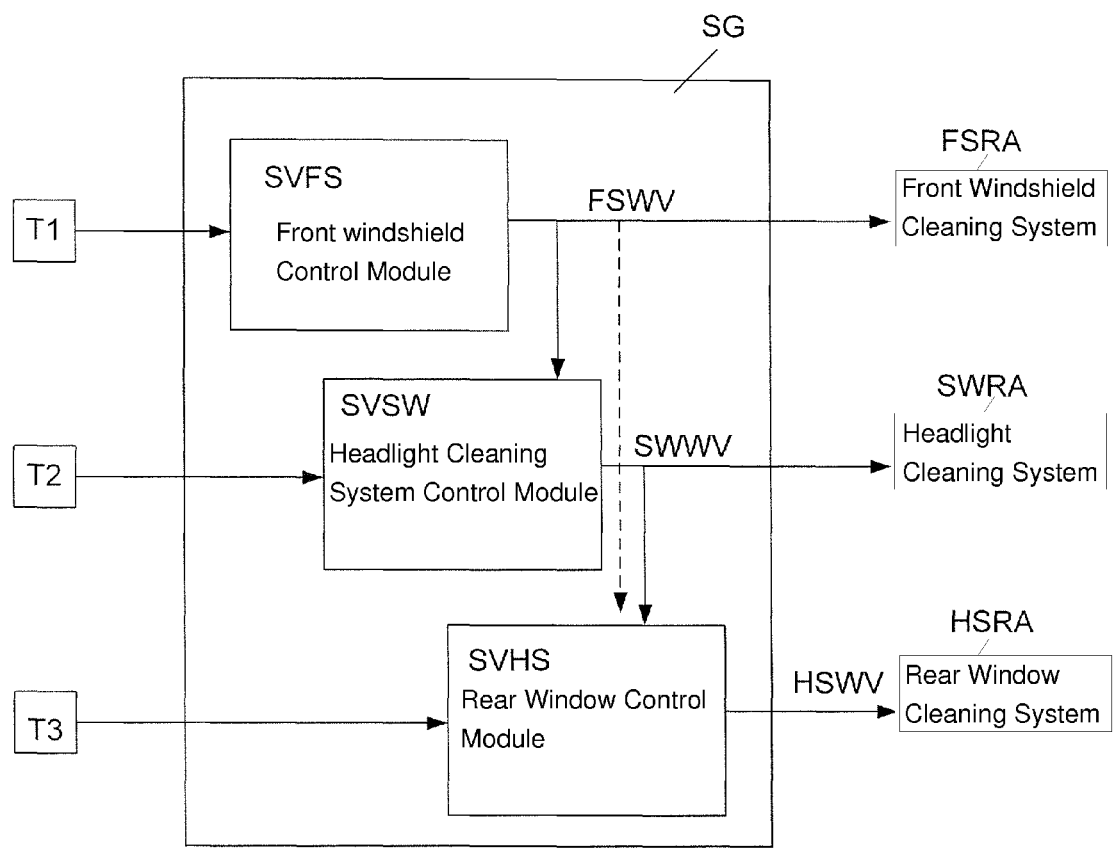
FIG. 1 is an exemplary, schematically illustrated control device of a rear window wiper for triggering a wiping-washing process as a function of the actuation of a headlight cleaning system.

FIG. 1 shows a control unit SG of a motor vehicle (not illustrated here) which has not only a front windshield cleaning system FSRA and a rear window cleaning system HSRA, but also a headlight cleaning system SWRA for the headlights of the motor vehicle. Integrated into the control unit SG are a control device SVFS for actuating the front windshield cleaning system (including the front windshield wiper), a control device SVSW for actuating the headlight cleaning system SWRA and a control device SVHS for actuating the rear wiper cleaning system (including the rear window wiper). Each of these three control device modules SVFS, SVSW and SVHS receives, as an input signal, a triggering signal for the manual triggering of a washing process (front windshield wiping-washing process, rear window wiping-washing process and headlight washing process) as soon as a pushbutton key T1, T2 or T3, provided for that purpose, has been activated by the driver. In addition, further input signals (not illustrated here) can be present at the respective control device SVFS, SVSW and SVHS which are used to trigger an automatic washing process by the corresponding cleaning system FSRA, SWRA or HSRA.

As soon as a washing process of the front windshield is requested manually on the basis of a pushbutton key activation of the pushbutton key T1, or a washing process of the front windshield is requested in a system-conditioned fashion, that is to say automatically, on the basis of evaluation of input signals which are present, a corresponding triggering signal FSWV is transmitted to the front windshield cleaning system FSRA. At the same time, this triggering signal FSWV is also sent to the control device SVSW for actuating the headlight cleaning system SWRA. In addition, as illustrated here by dashed lines, the triggering signal FSWS can also be sent to the control device SVHS for actuating the rear window cleaning system HSRA.

As soon as a washing process of the headlights is requested manually on the basis of a pushbutton key activation of the pushbutton key T2, or a washing process of the headlights is requested in a system-conditioned fashion, that is to say automatically, on the basis of an evaluation of input signals which are present (inter alia of the actuation signal FSWV of the front windshield cleaning system FSRA), a corresponding triggering signal SWWV is transmitted to the headlight cleaning system SWRA. At the same time, this triggering signal SWWV is also sent to the control device SVHS for actuating the rear window cleaning system HSRA.

Finally, the control device SVHS determines, for the actuation of the rear window cleaning system and of the rear wiper cleaning system (including rear window wiper), whether a washing process of the headlights is requested either manually on the basis of a pushbutton key activation of the pushbutton key T3 or in a system-conditioned fashion, that is to say automatically, on the basis of an evaluation of input signals which are present (inter alia of the actuation signal FSWV of the front windshield cleaning system FSRA and of the actuation signal SWWV of the headlight cleaning system SWRA). If a manual request is present or if a request for the automatic triggering of a wiping-washing process of the rear window cleaning system is determined, a corresponding triggering signal HSWV is transmitted to the rear window cleaning system.

Figure 2:
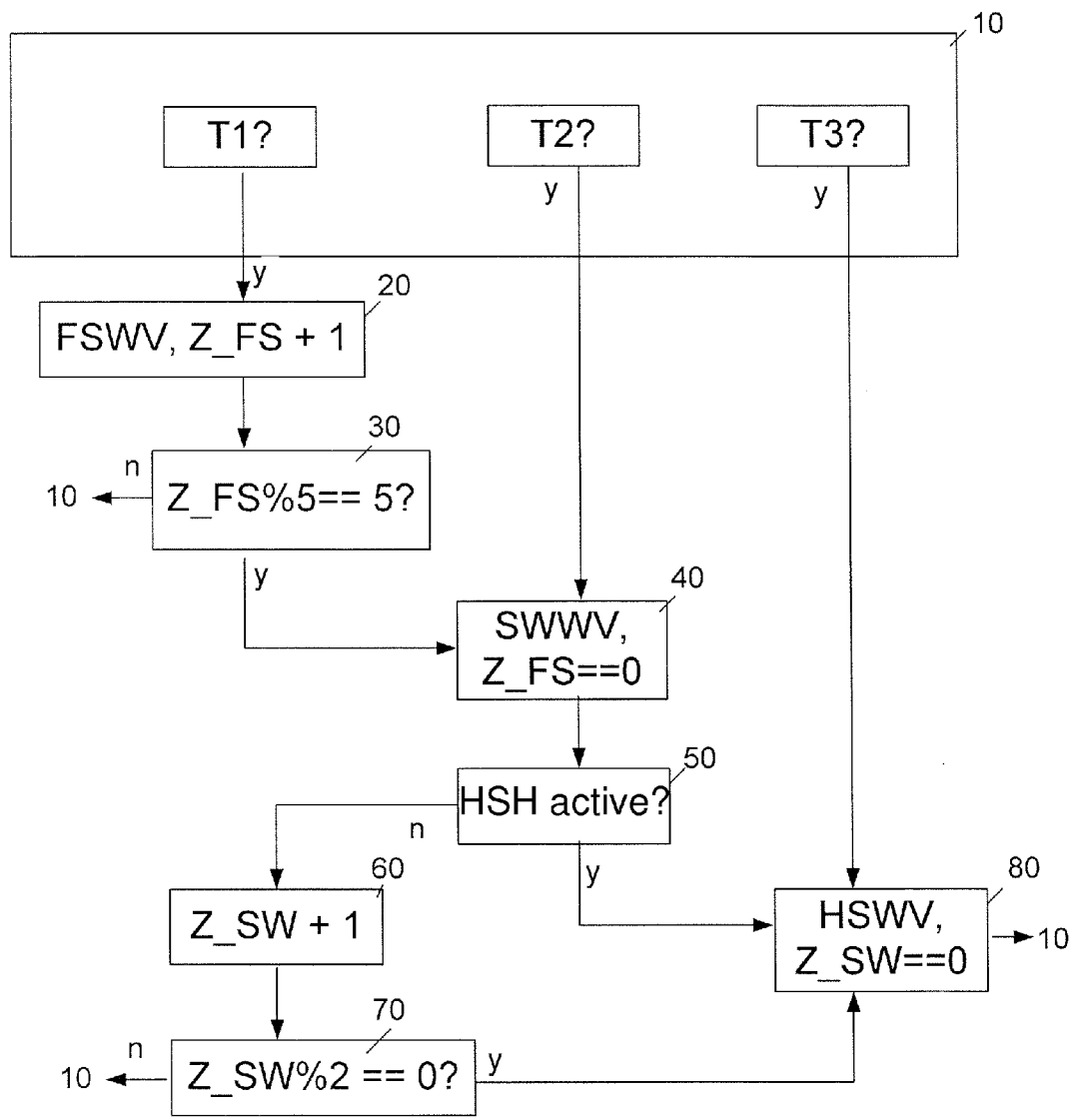
FIG. 2 is a highly simplified flowchart illustrating a preferred embodiment of the method according to the invention.

An example of an advantageous refinement of a method for triggering a wiping-washing process of a rear window cleaning system will now be illustrated on the basis of FIG. 2. The flowchart is started with step 10. It is continuously interrogated in parallel here whether one of the pushbutton keys T1, T2 or T3 is activated for the manual triggering of a corresponding cleaning process. In this context, in a way analogous to the device in FIG. 1, a wiping-washing process of the front windshield is requested with the activation of the pushbutton key T1, a washing process of the headlights is requested with the activation of the pushbutton key T2, and a wiping-washing process of the rear window is requested with the activation of the pushbutton key T3.

If activation of the pushbutton key T1 is detected, in the next step 20 a wiping-washing process FSWV of the front windshield is triggered and, at the same time, a counter Z_FS for counting the number of wiping-washing processes FSWV of the front windshield is increased by 1. Subsequently, in the next step 30 it is checked whether the counter Z_FS has assumed the value 5, i.e. it is checked whether a wiping-washing process FSWV of the front windshield has already been triggered 5 times. If this is not the case, the system jumps back to step 10.

However, if it is detected that the counter has reached the value 5, the system jumps to step 40, and a washing process SWWV of the headlights is triggered. At the same time, the counter Z_FS for counting the number of wiping-washing processes FSWV of the front windshield is reset to zero. Likewise, the system jumps directly from step 10 to step 40 if activation of the pushbutton key T2 is detected.

Subsequently, in the next step 50 it is checked whether the rear window heater HSH is active. If this is the case, after the checking of a possible iced-up state of the rear window the system jumps to step 80, and a wiping-washing process of the rear window is triggered, i.e. when the rear window heater HSH is switched on a wiping-washing process of the rear window is also triggered (first duty cycle=1:1) whenever a headlight cleaning process is triggered.

However, if it is detected in step 50 that the rear window heater HSH is not switched on, the system jumps to step 60 and the counter Z_SW for counting the number of washing processes of the headlights is increased by 1. Subsequently, in the next step 70 it is checked whether the counter Z_SW for counting the number of triggered washing processes of the headlights has assumed the value 2, i.e. it is checked whether a washing process SWWV of the headlights has already been triggered twice. If this is not the case, the system jumps back to step 10.

However, if it is detected that the counter has reached the value 2, the system jumps to step 80 and a wiping-washing process of the rear window is triggered, i.e. when the rear window heater HSH is not switched on a wiping-washing process HSWV of the rear window is also only triggered after every second time the headlight cleaning process SWWV has been triggered. At the same time, a counter Z_SW for counting the number of washing processes SWWV of the headlights is reset to zero. After this step, the system jumps again to the start of the method after step 10, and the entire sequence starts from the beginning. Likewise, the system jumps directly from step 10 to step 80 if activation of the pushbutton key T3 is detected.

For the sake of completeness it will also be mentioned here that although this example merely describes a dependence of the control of the rear window cleaning system as a function of the actuation of the headlight cleaning system, in an analogous procedure actuation of the front windshield cleaning system is also possible instead of the evaluation of the actuation of the headlight cleaning system.

By means of the method presented here, it can be ensured in a simple and cost-effective way that continuous and automatic cleaning of the rear window, which is adapted to the environmental conditions, takes place by way of the automatic triggering of the wiping-washing process of the rear window as a function of the actuation of the front windshield.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling a wiping-washing process of a rear window cleaning system of a motor vehicle equipped with a front windshield cleaning system and a headlight cleaning system, the method comprising the acts of: controlling the wiping-washing process of the rear window cleaning system as a function of an actuation state signal of the headlight cleaning system and as a function of an actuation state signal of the front windshield cleaning system.

2. The method according to claim 1, wherein the act of controlling the wiping-washing process comprises:
    triggering the wiping-washing process of the rear window system when the headlight cleaning system is actuated; and
    triggering the wiping-washing process of the rear window system when the front windshield cleaning system is active.

3. The method according to claim 2, wherein the triggering of the wiping-washing process occurs at the latest with the triggering of a headlight cleaning process of the headlight cleaning system.

4. The method according to claim 3, wherein the triggering of the wiping-washing process of the rear window system is carried out simultaneously with the triggering of the headlight cleaning process of the headlight cleaning system.

5. The method according to claim 3, wherein the wiping-washing process of the rear window system is triggered with at least one of:
    a predefined first duty cycle with respect to the headlight cleaning process of the headlight cleaning system and,
    a predefined second duty cycle with respect to the wiping-washing process of the front windshield cleaning system.

6. The method according to claim 5, wherein the wiping-washing process of the rear window cleaning system is further controlled as a function of an operation of a rear window heater.

7. The method according to claim 6, wherein when the rear window heater is active:
   the wiping-washing process of the rear window cleaning system is triggered with a predefined third duty cycle with respect to the headlight cleaning process of the headlight cleaning system, or
   the wiping-washing process of the rear window cleaning system is triggered with a predefined fourth duty cycle with respect to the wiping-washing process of the front windshield cleaning system.

8. The method according to claim 7, wherein when the rear window heater is active, controlling the wiping-washing process of the rear window cleaning system such that a quantity of washing water used during the wiping-washing process is changed during the wiping washing process.

9. The method according to claim 8, further comprising the acts of:
   controlling the wiping-washing process of the rear window cleaning system as a function of a flow of current through a rear window heater of the motor vehicle such that at least one of:
      the wiping-washing process of the rear window cleaning system is triggered with a predefined fifth duty cycle with respect to the headlight cleaning process of the headlight cleaning system and,
      the quantity of washing water during the wiping-washing process is varied as a function of a flow of current through the rear window heater.

10. The method according to claim 7, wherein when the rear window heater is active, controlling the wiping-washing process of the rear window cleaning system such that a quantity of washing water used during the wiping-washing process is changed during the wiping washing process.

11. The method according to claim 6, wherein if the rear window heater is operating, the wiping-washing process of the rear window cleaning system is triggered as a function of an actuation of the headlight cleaning system.

12. The method according to claim 1, wherein the wiping-washing process of the rear window cleaning system is further controlled as a function of an operation of a rear window heater.

13. The method according to claim 1, further comprising the act of:
   controlling the wiping-washing process of the rear window cleaning system as a function of a flow of current through a rear window heater of the motor vehicle.

14. The method according to claim 1, further comprising the act of:
   controlling the wiping-washing process of the rear window cleaning system as a function of a detected or predicted iced-up state of the rear window.

15. The method according to claim 14, wherein the predicted iced-up state of the rear window is determined by evaluating a starting current of rear window wiper motor of the motor vehicle.

16. A apparatus comprising: a rear window cleaning system of a motor vehicle; and a controller configured to generate control signals that control a wiping-washing process of the rear window cleaning system as a function of an actuation state signal of a headlight cleaning system of the motor vehicle and an actuation state signal of a front windshield cleaning system of the motor vehicle.

17. A computer product comprising a non-transitory computer readable medium having stored thereon program code segments that when executed by a processor of a rear window cleaning system cause the processor to: receive signals of a headlight cleaning system and of a front windshield cleaning system of a motor vehicle; and control a wiping-washing process of a rear window cleaning system as a function of said signal of the headlight cleaning system and said signal of the front windshield cleaning system.

* * * * *